M. GOLDING.
TRITURATING-MACHINES.

No. 195,120. Patented Sept. 11, 1877.

Witnesses
Harry A. Crawford.
Harry Smith

Inventor
Moses Golding
by his Attorneys
Howson Son

UNITED STATES PATENT OFFICE.

MOSES GOLDING, OF TRENTON, NEW JERSEY.

IMPROVEMENT IN TRITURATING-MACHINES.

Specification forming part of Letters Patent No. 195,120, dated September 11, 1877; application filed July 28, 1877.

*To all whom it may concern:*

Be it known that I, MOSES GOLDING, of Trenton, New Jersey, have invented a new and useful Improvement in Triturating-Machines, of which the following is a specification:

My invention consists of certain improvements, fully described hereinafter, in that class of grinding-machines in which the triturating effect is produced by the combined action of a rotating vessel and a number of balls contained within the said vessel, the main objects of my invention being to increase the efficiency of machines of this class, and to prevent the discoloration of the material operated on.

Figure 1:
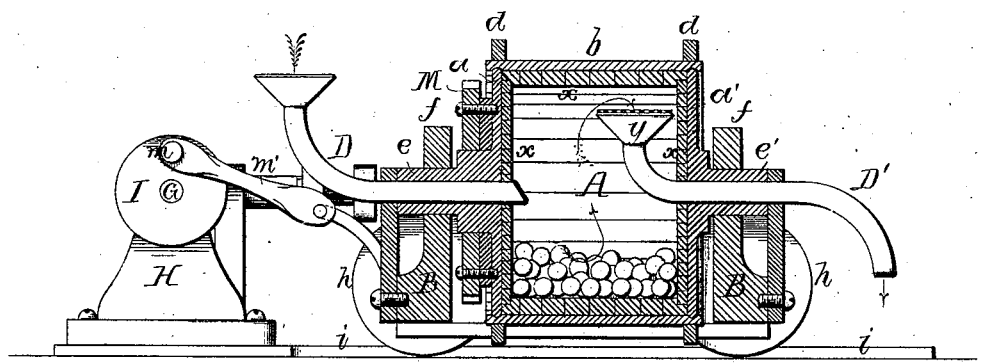
Figure 2:
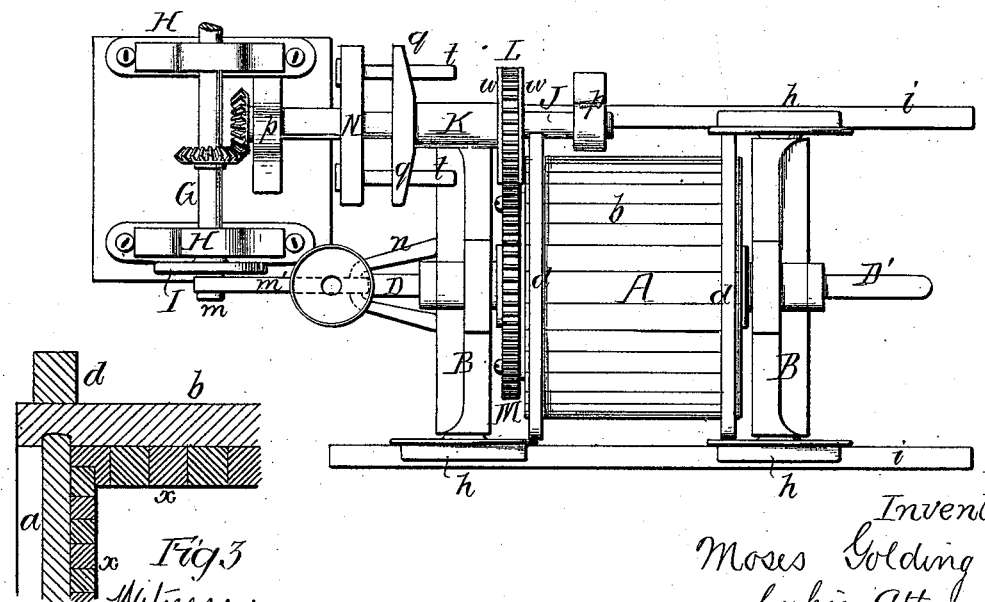
Figure 3:
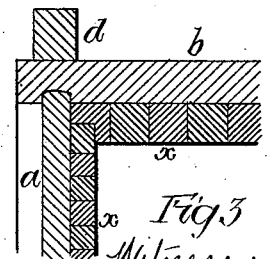

In the accompanying drawing, Figure 1 is a vertical section of my improved triturating-machine; Fig. 2, a plan view of the same, and Fig. 3 an enlarged sectional view of part of the machine.

A is a vessel, composed of the opposite heads or disks $a$ $a'$ and a cylindrical casing, all properly secured together and strengthened by hoops $d$.

The heads are made of cast-iron, and the exterior casing, in the present instance, of wooden staves $b$, properly fitted together.

The vessel A has two hollow journals, one journal, $e$, projecting from the head $a$, and the other journal, $e'$, from the head $a'$. The two journals are adapted to bearings $ff$ on a carriage, B, which is provided with flanged wheels $h$, bearing on rails $i$, secured to a suitable foundation.

D is a pipe, through which the material to be triturated is introduced into the vessel A, and D' is the outlet-pipe, both of these pipes being so secured to the carriage B that they shall traverse, but not turn, with the same.

G is the driving-shaft, adapted to bearings in the standards H H, and having a crank or crank-wheel, I, the pin $m$ of which is connected by a rod, $m'$, to a projection, $n$, on the end of the carriage B, which, together with its vessel A, must consequently be reciprocated when the shaft G is turned.

The shaft G is geared by bevel-wheels to a shaft, J, which turns in standards $p$ $p$; and on this shaft is a sleeve, K, provided at one end with a pinion, L, gearing into a cog-wheel, M, secured to the head $a$ of the vessel A, the other end of the sleeve having two arms, $q$ $q$, through each of which passes a pin, $t$, on a carrier, N, secured to the shaft J. As the pinion L is provided with flanges $w$ $w$, between which the teeth of the wheel M project into the spaces between the teeth of the said pinion, the sleeve K must reciprocate on its shaft with the carriage B, and the arms $q$ $q$ must slide to and fro on the pins $t$ $t$ of the carrier, so that on turning the driving-shaft G a combined reciprocating and rotating motion must be imparted to the vessel A, which contains a number of balls of a material which must be determined by the character of the substance to be ground.

While my invention is applicable to the triturating of many different substances, it has been designed more especially for reducing quartz to a very fine powder prior to mixing it with other ingredients for pottery-clay. When the machine is used for this purpose the balls should be made of some hard mineral, and the interior of the vessel should be lined with such material as will resist the triturating effect of the balls and prevent the discoloring of the quartz, which would take place if it were brought in contact with cast-iron or other metal while being triturated by the action of the balls. I have found that a lining of hard wood will serve the desired purpose well, and that this lining will be very durable if the wooden blocks or strips $x$ are so arranged within the rotating vessel that their end grain will be presented to the action of the balls, as seen in the enlarged view, Fig. 3, of a portion of the vessel.

As the vessel A rotates and reciprocates, the quartz, reduced to comparatively small particles, is from time to time introduced into the vessel through the pipe D, and such of the mineral as has been reduced to an impalpable powder will rise within the vessel and find its way through fine gauze on the top of the hopper $y$ into the pipe D, by which it is conducted into any suitable receptacle. By turning the pipe D' upward in the vessel none but the finest particles can gain access to it.

The triturating effect of the balls must necessarily be increased by causing the vessel A to reciprocate while it rotates.

I claim as my invention—

1. A triturating-machine in which a vessel containing balls is combined with mechanism through the medium of which the said vessel receives both a rotating and reciprocating motion.

2. The combination of the vessel A, the carriage B, and its wheels $h$, with rails adapted to the wheels, substantially as described.

3. The combination of the vessel A, its hollow journals, and inlet and outlet pipes, with a reciprocating carriage, B.

4. The combination of the vessel A with outlet-pipe D', turned upward within the vessel, as and for the purpose set forth.

5. The combination of the driving-shaft G, the carriage B, its vessel A, and devices by which the shaft is caused to reciprocate the said carriage, in combination with mechanism by which a rotating movement is imparted to the vessel from the same shaft, all substantially as set forth.

6. The combination of the carriage B and vessel A with the shaft J, the sleeve K, driven by and arranged to slide on the shaft, and geared to the said vessel A, all substantially as set forth.

7. The combination of the shaft J, the carrier N, and its pins $t$, with the sleeve K arranged to slide on the shaft, and having arms $q\ q$ for receiving the pins, all as described.

In testimony whereof I have signed my my name to this specification in the presence of two subscribing witnesses.

MOSES GOLDING.

Witnesses:
HARRY A. CRAWFORD,
HARRY SMITH.